United States Patent [19]
Motoyama et al.

[11] Patent Number: 5,732,674
[45] Date of Patent: Mar. 31, 1998

[54] ENGINE CONTROL SYSTEM

[75] Inventors: Yu Motoyama; Michihisa Nakamura; Yoshihiko Moriya, all of Iwata, Japan

[73] Assignee: Yamaha Hatsudoki Kabushiki Kaisha, Iwata, Japan

[21] Appl. No.: 645,216

[22] Filed: May 13, 1996

[30] Foreign Application Priority Data

May 12, 1995 [JP] Japan .................................. 7-114291

[51] Int. Cl.$^6$ ............................ F02B 33/04; F02B 3/04; F02D 41/40
[52] U.S. Cl. ................................ 123/299; 123/73 C
[58] Field of Search ........................... 123/295, 299, 123/300, 73 C

[56] References Cited

U.S. PATENT DOCUMENTS

| | | | |
|---|---|---|---|
| 4,955,339 | 9/1990 | Sasaki et al. | 123/300 |
| 5,205,254 | 4/1993 | Ito et al. | 123/73 C |
| 5,257,607 | 11/1993 | Gillespie | 123/73 C |
| 5,271,362 | 12/1993 | Kobayashi et al. | 123/299 |
| 5,553,579 | 9/1996 | Yoshida et al. | 123/299 |

*Primary Examiner*—Willis R. Wolfe
*Attorney, Agent, or Firm*—Knobbe, Martens, Olson & Bear LLP

[57] ABSTRACT

An improved method of operating a direct cylinder-injected engine wherein adequate fuel and scavenging can be achieved at mid and high-mid range by injecting the fuel in two increments. Various control strategies are disclosed, and they all particularly lend themselves for use with two-cycle crankcase compression engines.

33 Claims, 7 Drawing Sheets

ENGINE CONTROL SYSTEM

BACKGROUND OF THE INVENTION

This invention relates to an engine and engine control system and more particularly to a direct injected, two-cycle engine and fuel injection control therefor.

Although direct cylinder fuel injection is common in diesel engines, its application to spark-ignited engines is less common. Nevertheless, in the continuing effort to improve fuel economy and exhaust emission control, the desirability of direct cylinder fuel injection for spark-ignited engines is becoming apparent. However, there are certain problems attendant to the utilization of direct cylinder injection in spark-ignited engines.

These problems deal primarily with the desirability to maintain some form of stratification in the combustion chamber under less than full load conditions. If a homogenous mixture is charged into the engine combustion chamber under all running conditions, then the overall mixture strength tends to be too rich, particularly at low and mid-range loads.

Therefore, it has been proposed to provide an arrangement wherein the fuel injection time is delayed until immediately before the firing of the spark plug. By doing this, it is possible to run with a leaner than stoichiometric mixture in the entire combustion chamber. A stoichiometric charge will be present at the spark plug at the time of firing if the injection spray pattern is correctly oriented, but the remainder of the cylinder may be filled with pure air or a leaner than stoichiometric mixture.

There are, however, a number of obstacles to the delayed fuel injection in direct cylinder-injected engines. These problems are particularly acute in conjunction with two-cycle or other types of ported engines. This is because of the overlap between the scavenging and the exhaust cycles. If the fuel injection is delayed too late, there is a risk that some of the fuel will escape from the exhaust port before it has had an opportunity to burn, with obviously undesirable results.

Furthermore, it is difficult to control or obtain the desired amount of fuel injection under mid and high mid-range engine performances if the injection is delayed until immediately before spark plug firing. Spark-ignited direct injected engines utilize normally lower injection pressures than diesel engines. As a result, the fuel injection occurs at a time when the cylinder pressure is high, and this will effect the amount of fuel that is injected. It may, in fact, be difficult or impossible to inject the necessary amount of fuel in the finite time period before the spark plug is fired.

Also, there becomes a problem in conjunction with the transition from one load condition to another. To obtain the homogenous mixture, injection is started quite early, particularly under high-speed, high-load conditions. However, if at mid-range and high mid-range the injection is delayed, then the control strategy tends to become complicated, and transitional running may not be as desired.

It is, therefore, a principal object of this invention to provide an improved direct cylinder injected internal combustion engine and control methodology therefor.

It is a still further object of this invention to provide an improved method and operation for controlling a direct cylinder injected two-cycle engine so as to improve running under all conditions and permit fuel stratification.

SUMMARY OF THE INVENTION

This invention is adapted to be embodied in an internal combustion engine and method for operating such an engine. The engine has a combustion chamber, the volume of which varies cyclically during engine operation. An induction system is provided for delivering an air charge to the combustion chamber. A direct fuel injection system is provided for injecting fuel directly into the combustion chamber. An ignition system ignites the fuel-air charge formed in the combustion chamber. An exhaust system discharges the burnt combustion product from the combustion chamber.

In accordance with an engine practicing the invention, a sensor is provided for sensing an engine condition, and the fuel injection is controlled in response to the output of the sensor. The injection of fuel at at least one range of running operation sensed by the sensor is accomplished in two installments, both occurring before firing of the spark plug and separated by a period when no fuel is injected.

In accordance with a method for operating such an engine, the engine running characteristics are sensed. The fuel injection is controlled during at least one range of engine running conditions so that the fuel for combustion is injected in two installments, each occurring before spark plug firing but separated by a period when no fuel is injected.

BRIEF DESCRIPTION OF THE DRAWINGS

FIG. 6, A, B and C are a graphical views showing the fuel injection timing in accordance with the ranges A, B, and C of FIG. 5.

DETAILED DESCRIPTION OF THE PREFERRED EMBODIMENTS OF THE INVENTION

Figure 1:
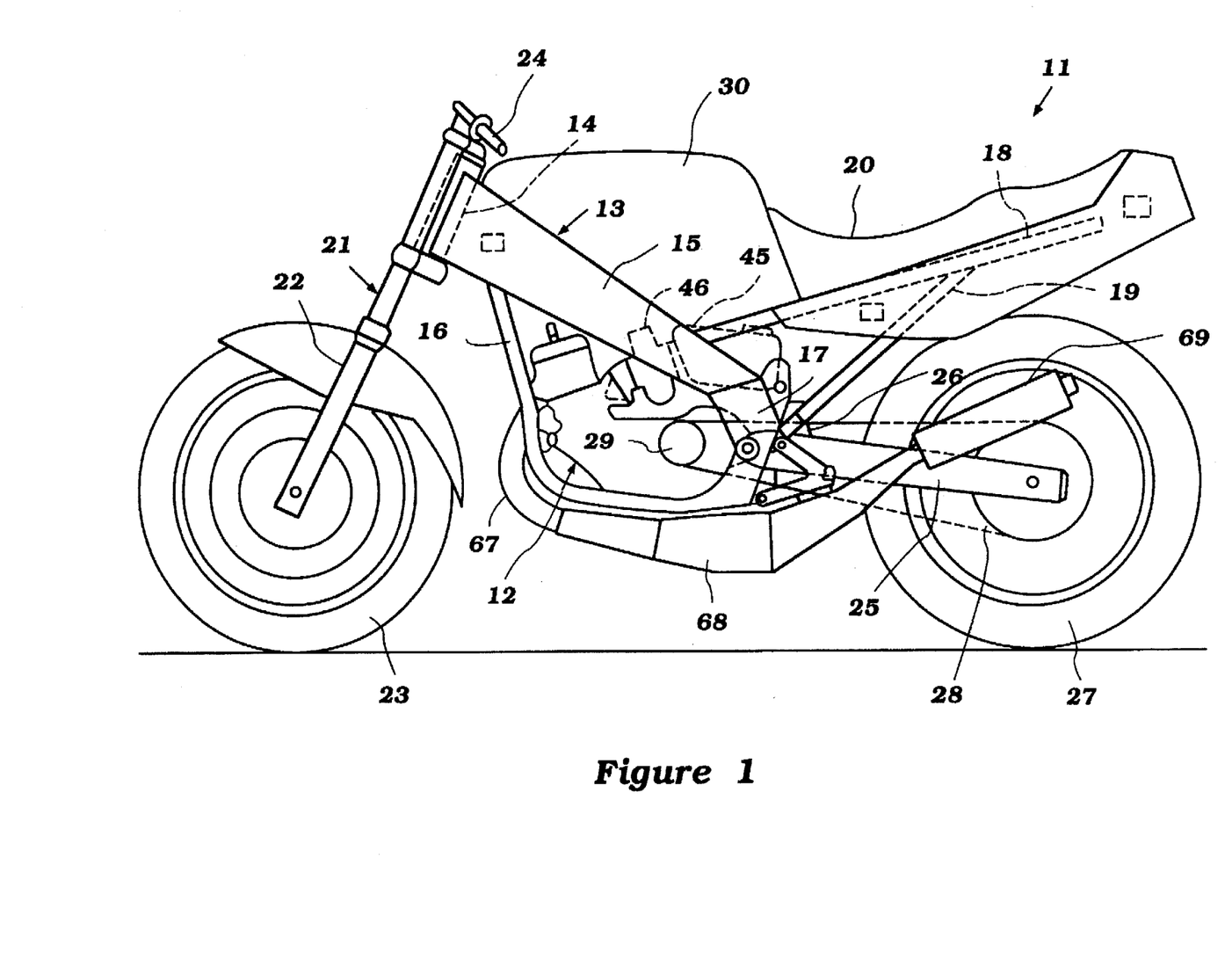
FIG. 1 is a side elevational view of a motorcycle powered by an internal combustion engine constructed and operated in accordance with an embodiment of the invention.

Referring now to the drawings, and initially to FIG. 1, a motorcycle, indicated generally by the reference numeral 11, is depicted, and the motorcycle 11 is powered by an internal combustion engine, indicated generally by the reference numeral 12. The engine 12 is constructed and operated in accordance with the invention. Although the invention deals primarily with the engine 12 and its control, the engine is depicted as being associated with a motor vehicle such as a motorcycle 11. This is because the invention has particular utility with, but is not limited to, such applications.

The motorcycle 11 is comprised of a main frame assembly, indicated generally by the reference numeral 13.

The main frame assembly 13 includes a head pipe 14 with joined main frame members 15 that extend rearwardly and downwardly therefrom. In addition, down pipes 16 extend downwardly and rearwardly from the main frame members 15 and terminate adjacent the rear end of the main frame members. The main frame members 15 and down tubes 16 are connected to a bracket assembly 17 at the rear end thereof. The frame 13 is completed in substantial part by a seat rail 17 and a seat rail pillar 18 on which a seat 19 is provided for accommodating a rider.

The head tube 14 dirigibly supports a front fork assembly 21 having a suspension unit 22 which rotatably journals and cushions the movement of a front wheel 23. The front wheel 23 is steered by a handlebar assembly 24 in a known manner.

A trailing arm 25 is journaled by the bracket 17 via a suspension system 26 of a known type. A rear wheel 27 is rotatably journaled at the rear end of the trailing arm 25. The rear wheel 27 is driven by a chain or belt 28 which is, in turn, driven by an output shaft pulley 29 of a change-speed transmission incorporated within the crankcase of the engine 12, as is well known in the motorcycle art.

Figure 2:
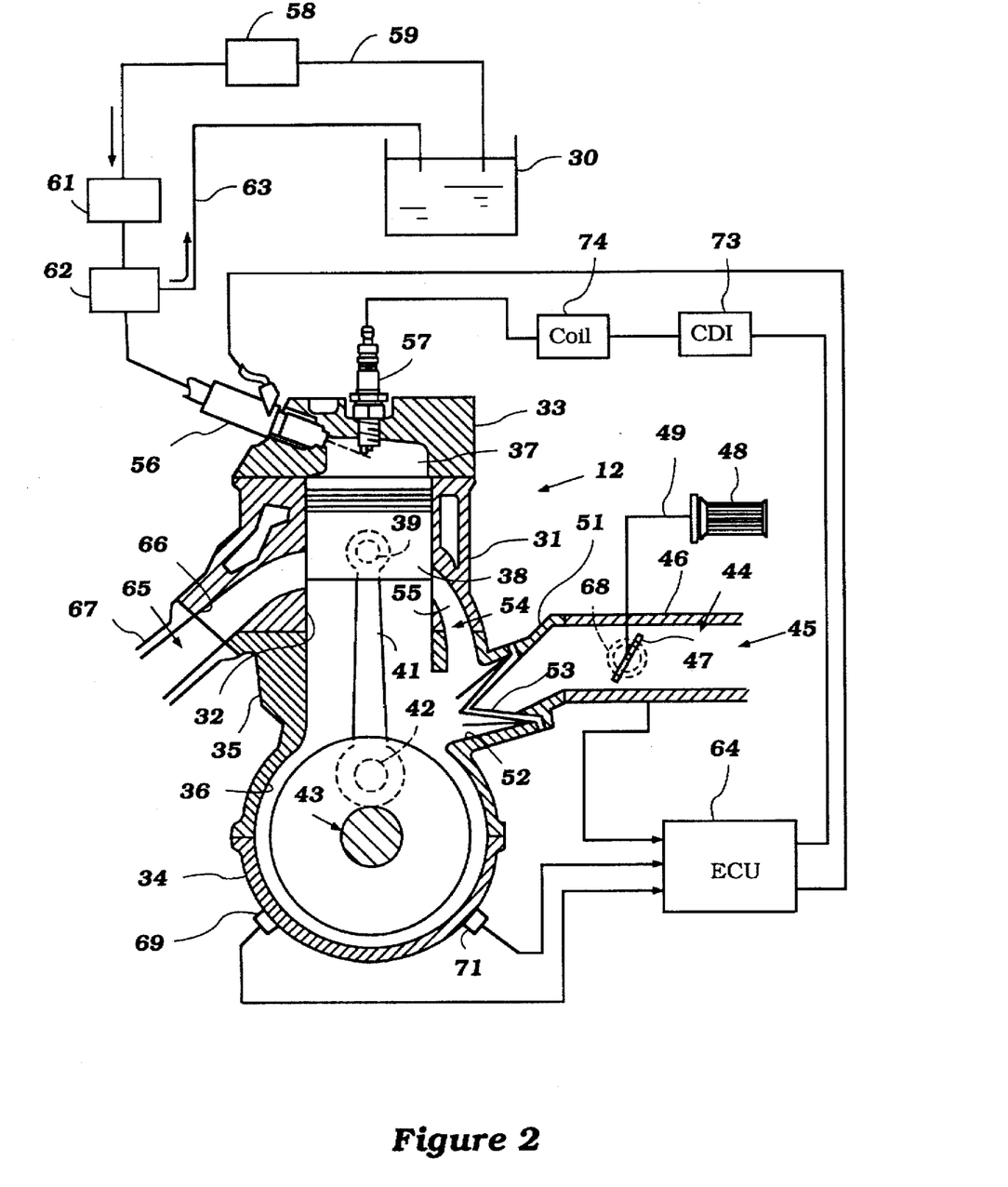
FIG. 2 is an enlarged, partially schematic, cross-sectional view showing the engine and its associated supporting components.

A fuel tank 31 is carried by the frame assembly 13 forwardly of the seat 20 and supplies fuel to the engine 12 in a manner which will be subsequently described by reference to FIG. 2.

As aforenoted, the description of the motorcycle 11 is primarily so that one skilled in the art can readily understand one type of environment in which the invention can be utilized. The invention, as has been noted, deals primarily with the engine 12 and its manner of operation. That construction will now be described by particular reference first to FIG. 2.

The engine 12 includes a cylinder block 31 in which at least one cylinder bore 32 is formed. The invention is described in conjunction with only a single cylinder bore 32 because it is believed that it will be readily obvious to those skilled in the art how the invention can be employed with engines having a wide variety of configurations such as in-line, V-type, or opposed engines. Also, the engine 12 operates on a two-stroke crankcase compression principle because the invention has particular utility with such engines. Again, however, it will be apparent to those skilled in the art how certain facets of the invention can be utilized with other types of engines. The invention does have particular utility, however, with ported engines for the reasons aforenoted. This can include, in addition to reciprocating engines, rotary engines.

The upper end of the cylinder bore 32 is closed by a cylinder head 33 that is affixed to the cylinder block 31 in a known manner. In addition, a crankcase member 34 is affixed to a skirt 35 at the lower end of the cylinder block 31 to close the lower end of the cylinder bore 32. The skirt 35 and crankcase member 34 define a crankcase chamber 36. If the engine 12 is of the multiple-cylinder type, the crankcase chambers 36 associated with each cylinder bore 32 will be sealed from the others in an appropriate manner.

The cylinder head 33 is formed with a recess 37 which registers in substantial part with the cylinder bore 32. This recess 37, the cylinder bore 32, and a piston 38 which reciprocates in the cylinder bore 32 form a combustion chamber of the engine. At top dead center position, as shown in FIG. 2, the substantial portion of the volume of the combustion chamber, which varies cyclicly during engine operation, is formed by the recess 37. Therefore and at times, the recess 37 will be referred to as the combustion chamber.

The piston 38 is connected by means of a piston pin 39 to the upper or small end of the connecting rod 41. The lower or big end of the connecting rod 41 is journaled on a throw 42 of a crankshaft, indicated generally by the reference numeral 43. The crankshaft 43 is rotatably journaled within the crankcase chamber 36 in any manner well known in the art.

An air charge is delivered to the crankcase chambers 36 by an air induction system, indicated generally by the reference numeral 44. This air induction system includes an air inlet device, shown partially in FIG. 1 and identified by the reference numeral 45, that supplies air to a throttle body 46. The throttle body 46 includes a throttle valve 47 which in FIG. 2 is depicted as of the butterfly type, but it can also include a sliding piston-type throttle valve, as shown in FIG. 1. As will become apparent, the construction is such that the throttle valve 47 is held in a substantially open position when the operator accelerator control, illustrated as a twist-grip throttle 48, is in its idle position. The twist-grip throttle 48 is connected to the throttle valve 47 through a wire actuator 49, as is well known in the motorcycle art.

The throttle body 46 delivers air to an intake manifold 51 which, in turn, has runners, if more than one cylinder is employed, that serve intake ports 52 formed in the cylinder block skirt 35. Reed-type check valves 53 are interposed between the manifold 51 and intake ports 52 so as to permit a charge to flow into the crankcase chambers 36 when the pistons 38 are moving upwardly. However, as the piston 38 moves downwardly to compress the charge in the crankcase chamber 36, the reed-type valve 53 will close to preclude reverse flow through the induction system 44.

The compressed air charge which has been compressed in the crankcase chambers 36 will be transferred to the combustion chambers 37 through a scavenging system, indicated generally by the reference numeral 54, and which include one or more scavenge passages 55. These scavenge passages open into the cylinder bore 32 in an area where they will be opened and closed by the reciprocation of the pistons 38, as is well known in the two-cycle engine field.

A fuel injector, indicated by the reference numeral 56, is mounted in the cylinder head 33 and sprays fuel into the combustion chamber recess 37 in proximity to the gap of a spark plug 57. Like the fuel injector 56, the spark plug 57 is mounted in the cylinder head 33.

Fuel is supplied to the fuel injector 57 from the fuel tank 30. A fuel filter 58 is provided in a supply conduit 59 which leads to a high-pressure fuel pump 61. The high-pressure fuel pump 61 may be of any known type and delivers the fuel to the fuel injector 56 through a fuel rail 62. A pressure regulator is mounted in the fuel rail 62 and regulates the pressure by bypassing fuel back to the fuel tank 30 through a return line 63.

Fuel is injected by the fuel injector 56 into the combustion chamber 37 in accordance with a control strategy which will be described. This fuel is then ignited by the spark plug 57 to cause the charge to burn and expand to drive the piston 38 downwardly. It should be noted that both the fuel injector 56 and the spark plug 57 are controlled by an ECU, indicated generally by the reference numeral 64, and which is related to the various components in a manner which will be described by reference later to FIG. 4.

The charge which burns in the combustion chamber 37 will eventually cause the piston 38 to move downwardly and uncover an exhaust system, indicated generally by the reference numeral 65, so as to permit the exhaust gases to exit the engine and be discharged to the atmosphere. The exhaust system 65 includes exhaust passages 66 formed in the cylinder block 31. These exhaust passages 66 communicate with an exhaust manifold 67 which, in turn, delivers the exhaust gases to an expansion chamber 68 and muffler 69 (FIG. 1) for discharge to the atmosphere.

The construction of the engine 12 and its auxiliaries as thus far described may be considered to be conventional, except for the facets dealing with the opening of the throttle valve 47 at its idle position. Therefore, where any details of the engine have not been described, they may be considered to be conventional.

Figure 3:
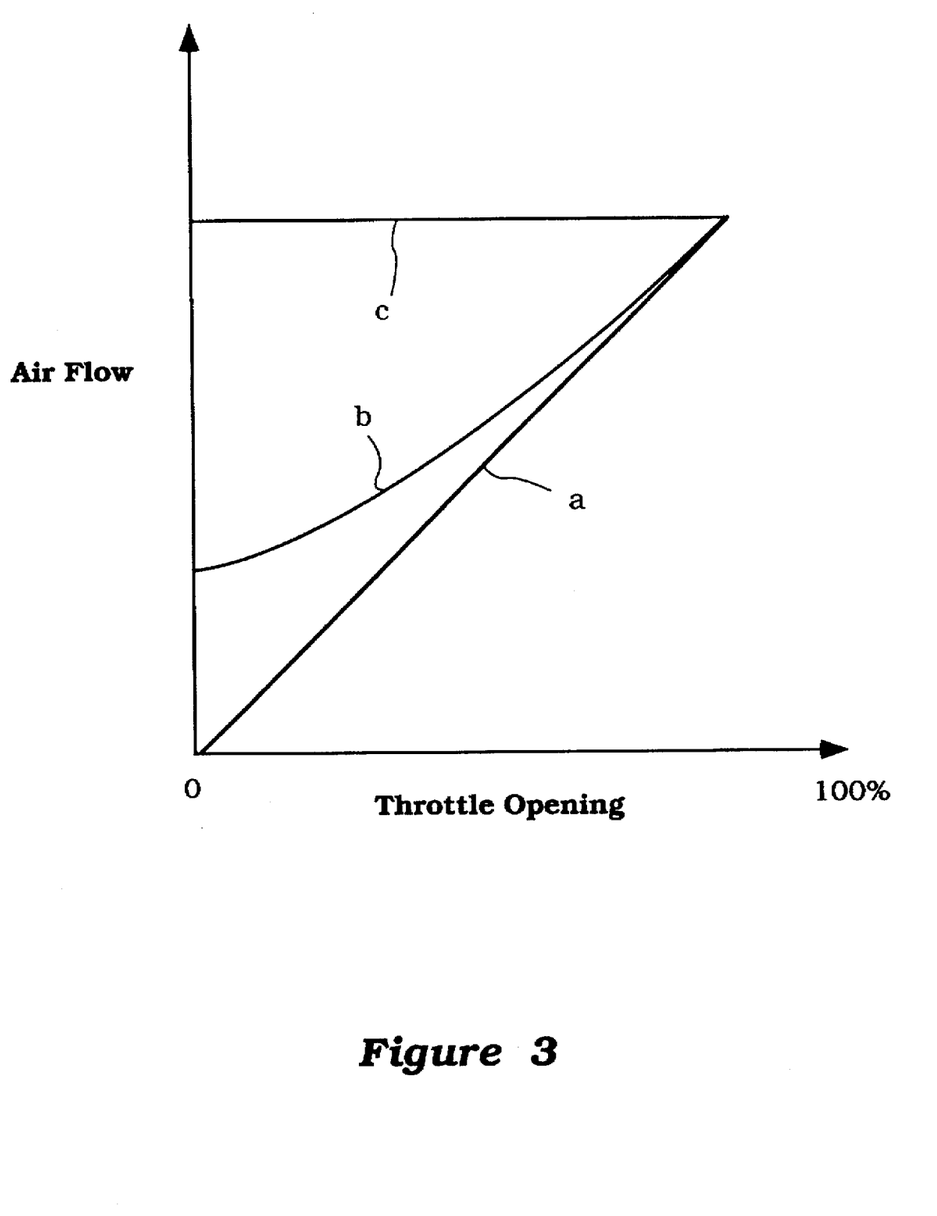
FIG. 3 is a graphical view showing the relationship between throttle opening and air flow in accordance with a conventional system, indicated by the curve a, and in accordance with two embodiments of the invention, indicated by the curves b and c, respectively.

FIG. 3 is a graphical view showing the conventional type of throttle control by the curve a. With this type of throttle control, as the throttle is opened from its closed or idle position to its full open, wide open throttle position, the flow area increases in a substantially linear fashion. Thus, there is substantial throttling of the air flow at idle and low speed, and this creates relatively large pumping losses. In accordance with the embodiment shown in FIG. 2, the throttle valve 47 operates along a curve, as shown at b, wherein there is a substantial air flow area, even when the throttle valve 47 is in its idle position. As a result, pumping losses are substantially minimized. Engine speed is controlled by controlling the amount of fuel which is delivered to the engine.

In accordance with another embodiment of the invention, the throttle valve 47 may be totally eliminated, and thus a situation as shown by the curve c will exist wherein there is no throttle resistance to the air flow to the engine under any running condition. Again, the engine speed is controlled through the amount of fuel supplied by the fuel injector 56.

Figure 4:
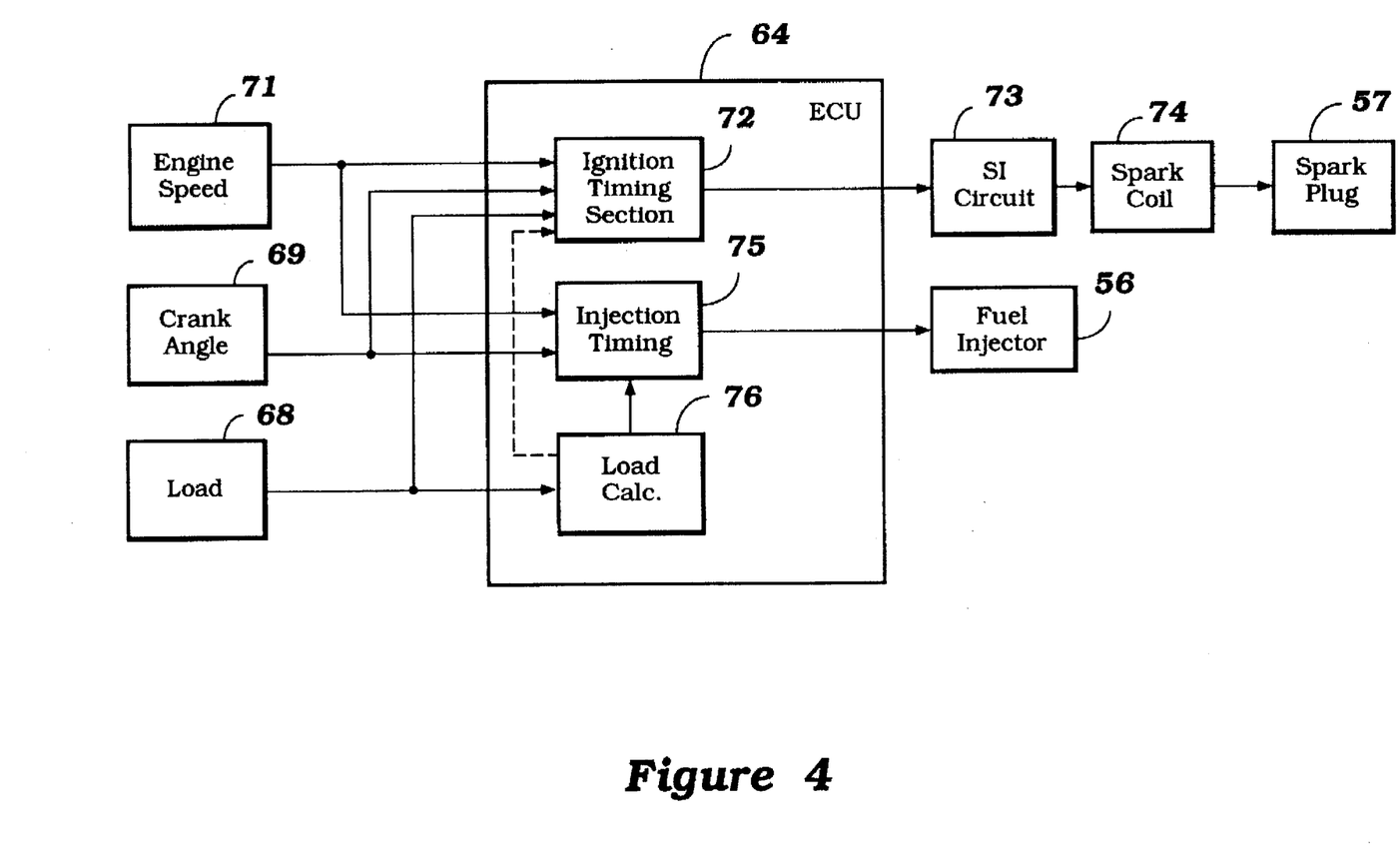
FIG. 4 is a partially schematic block diagram showing the relationship of certain sensor outputs, the ECU, and the control of the ignition and fuel injection system.

The relationship of the units for the engine control, and specifically the way in which the ECU 64 controls the firing of the spark plugs 57 and the fuel injection by the fuel injector 56 will now be described by primary reference to FIGS. 2 and 4. The engine 12 has certain sensors that sense engine running conditions. In addition to the sensors which will be described, it will be apparent to those skilled in the art how additional sensors may be employed for sensing other engine or ambient conditions and controlling the engine operation in response to these characteristics.

The sensors include an operator-demand sensor in the form of a throttle position sensor 68 which is associated with the throttle valve 47 and which outputs a signal indicative of the operator demand for engine power. In addition, there is provided an engine crankcase angle sensor 69 which outputs a signal indicative of the angular position of the crankshaft 43 for timing purposes. Furthermore, an engine speed sensor 71 also cooperates with the crankshaft 43 for providing a signal to the ECU indicative of the speed at which the engine is operating. In the illustrated embodiment, these three sensors will be the only sensors described. This is because the control strategy with which the invention deals is governed by engine speed and load primarily. Of course, other sensors will be utilized to accommodate other ambient and engine running conditions.

The signals from the sensors 68, 69, and 70 are transmitted to the ECU 64, and particularly to an ignition timing section 72 which sets the timing of firing of the spark plugs 57. The output signal from the ignition timing section 72 is transmitted to a spark ignition circuit, such as a CDI ignition system 73 which, in turn, triggers a spark coil 74 for firing the spark plugs 57 in a known manner.

The crank angle signal from the sensor 69 and the engine speed signal from the sensor 71 are output to a fuel injection timing control section 75 of the ECU. This injection timing section 75 also receives an output from an injection amount or load-calculating section 76 which outputs its signals to the ignition timing section 72 and injection timing section 75 so as to control the spark timing and the duration of fuel injection. This fuel injection control strategy will now be described in more detail by reference initially to FIGS. 5 and 6 which describe one particular control strategy.

Generally, fuel injection controls for engines control the timing of initiation of fuel injection and the duration of fuel injection timing. The fuel injection timing is generally done so as to be completed substantially before the spark plug 57 is fired. This permits the formation of a homogenous mixture in the combustion chamber. However, this does not afford stratification and thus has the disadvantages previously noted.

On the other hand, if injection timing is delayed until before the firing of the spark plug, then adequate fuel may not be supplied to permit maximum performance at high speed and high load for the reasons already noted. In addition, transitional problems may result.

Therefore and in accordance with an important feature of the invention, the fuel injection control is adopted so as to provide an optimum control under all running conditions. Basically, the way this is done is under at least some load conditions to inject fuel in incremental amounts. The first of these incremental amounts is injected well before the piston approaches top dead center and well before the spark plug firing. This fuel amount is injected in a quantity which may not necessarily support complete combustion, but because of the stratification feature which will be described, the fuel will completely burn.

There is a second fuel injection amount which is initiated and terminated just before the time of firing of the spark plug 57. This last injected fuel also will tend to congregate in the area around the gap of the spark plug 57 so as to provide a stoichiometric charge which will burn when the spark plug fires. As this charge burns and expands, the pressure on the remaining charge will be increased, and it also will burn so as to ensure complete combustion. This strategy is employed at least in the mid and high mid-range range, indicated at B in both FIGS. 5 and 6.

Figure 5:
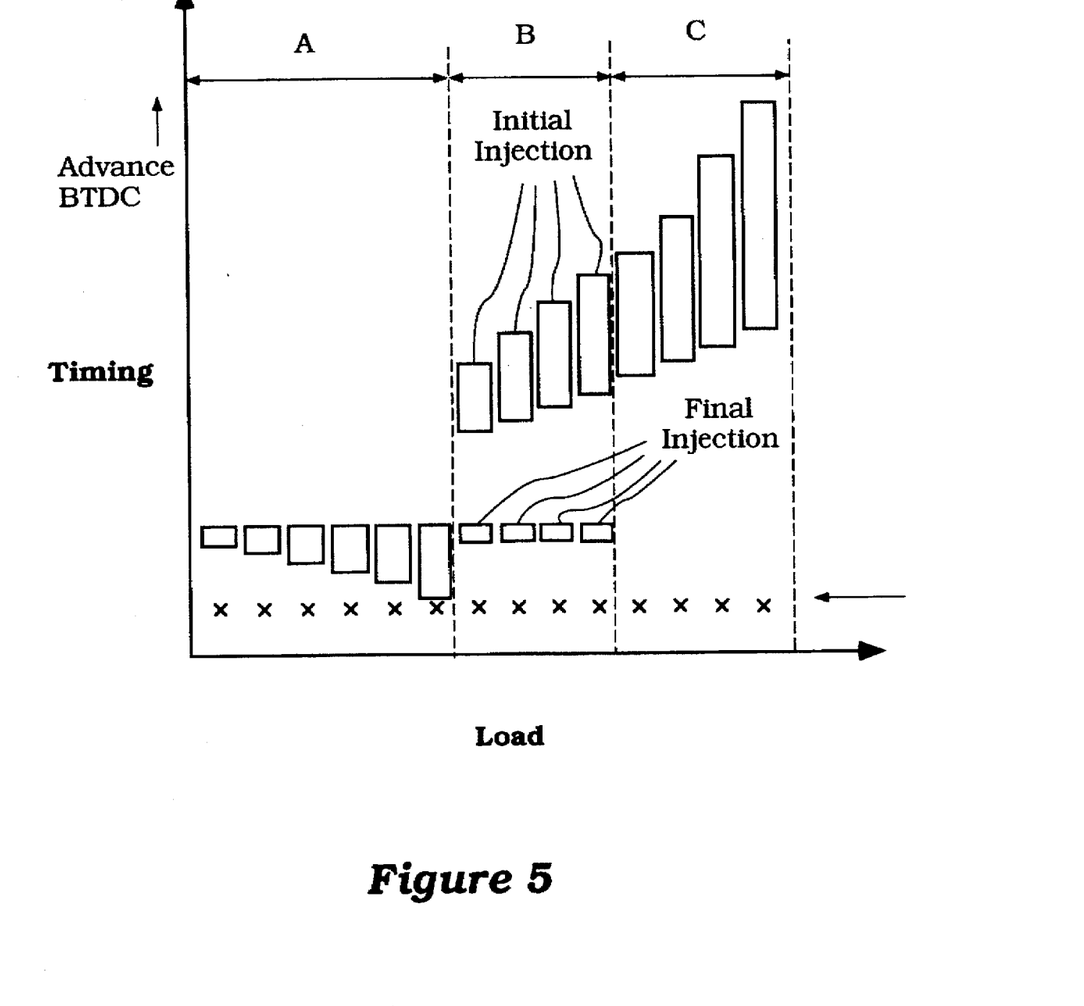
FIG. 5 is a diagram showing the relationship of spark timing, indicated by the X's, and fuel injection amounts, indicated by the block areas, in accordance with three different control ranges of the engine, these being low speed/low load A, mid and high mid-range B, and high load C.
Figure 6:
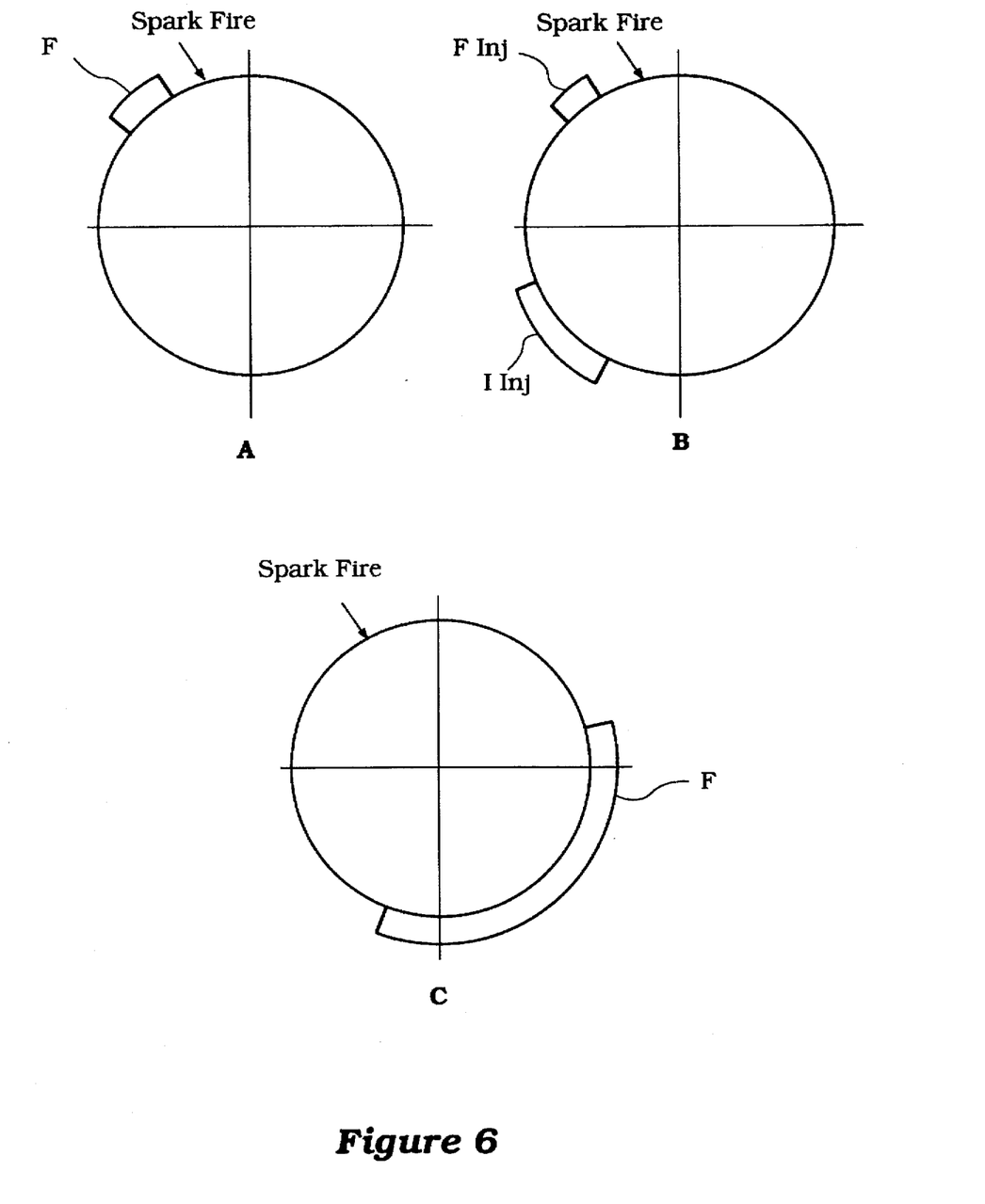

In accordance with this control strategy, when the engine is operating at the low-speed, low-load range, as seen in the area A in FIGS. 5 and 6, the fuel is injected at a time beginning at a fixed period before spark plug firing and terminating at a variable time, depending upon the load. The higher the load, the later the end of injection and the closer to spark plug firing. Hence, under low-speed, low-load conditions, all of the injection timing can be delayed. Since the fuel requirements are not high under this running condition, this delayed injection will be adequate to permit good engine operation.

On high-speed, high-load condition, however, as seen in the control domain C, fuel injection can begin at a time late in the down stroke of the piston wherein the scavenging flow will be substantially reduced and fuel is not likely to be swept from the combustion chamber. With this arrangement the end of fuel injection is completed sometime after the piston reaches bottom dead center and well before the time of firing of the spark plug. Thus, a homogenous stoichiometric charge will fill the combustion chamber.

In the control domain which forms the main portion of this invention, the middle and high intermediate load range B, there is provided a fixed amount of fuel injection which occurs immediately before spark plug firing. The variable amount of fuel is supplied between bottom dead center and one-half of the upward piston stroke so as to provide a leaner mixture that will burn because of the ignition of the stoichiometric charge and the pressure rise as aforenoted.

Thus, it will be seen that the initial injection phase of this portion of the control as seen in FIG. 5 really forms an extension of the high-speed, high-load condition with the superimposed additional stratified charge being injected later to ensure complete combustion.

Figure 7:
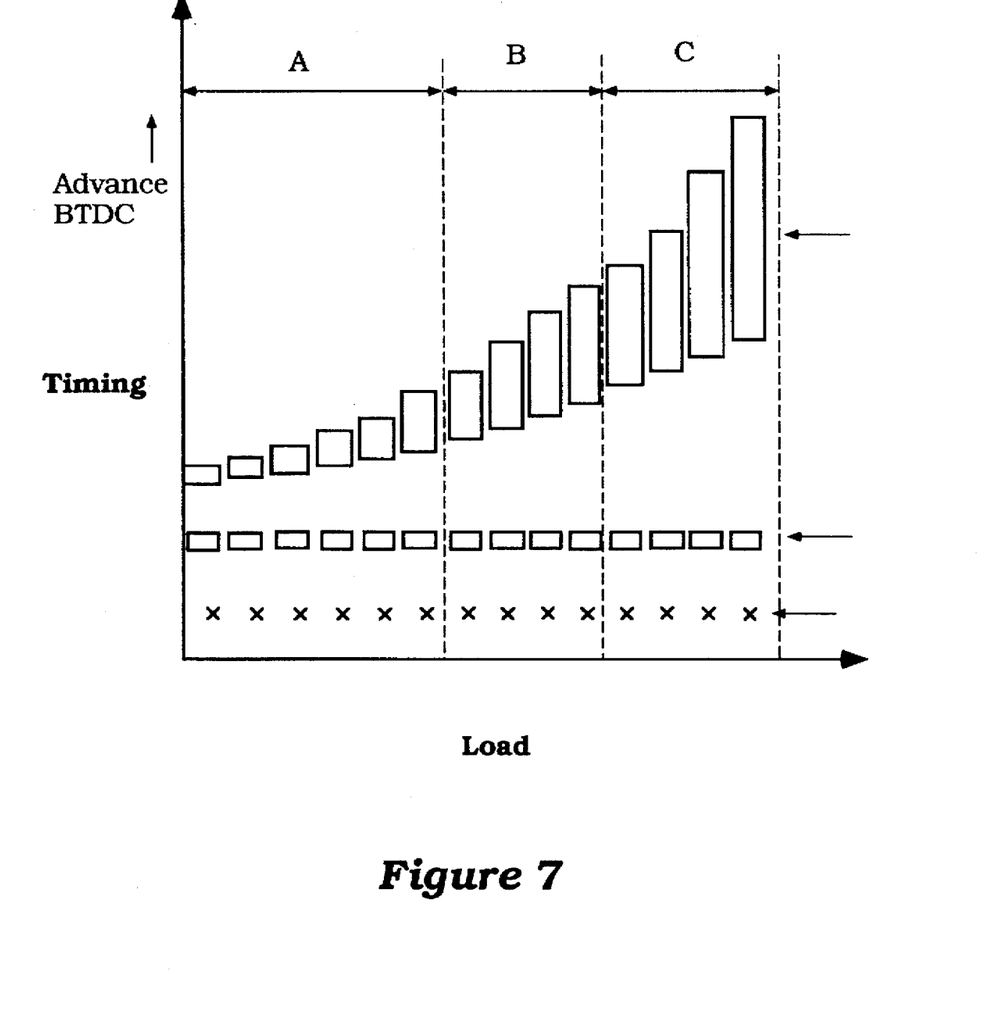
FIG. 7 is a graphical view, in part similar to FIG. 5, and shows another embodiment of control utilizing the same parameters and the same control ranges.

FIG. 7 shows another type of control strategy wherein the entire engine operation employs two injection cycles, and thus further extends the range of FIG. 5 toward the low-speed, low-load condition. With this embodiment the amount of fuel injected before firing is held constant under all engine running conditions.

Thus, from the foregoing description it should be readily apparent that the described methodology will provide good emission control, smooth running, and good fuel economy under all engine running conditions without sacrificing the performance under any running condition. In addition, fuel will not be swept out of the exhaust port, even with a two-cycle engine.

Of course, the foregoing description is that of a preferred embodiment of the invention, and various changes and modifications may be made without departing from the spirit and scope of the invention, as defined by the appended claims.

What is claimed is:

1. An internal combustion engine having a combustion chamber, the volume of which varies cyclically during engine operation, an induction system for delivering an air charge to said combustion chamber, a direct injection system for injecting fuel directly into said combustion chamber, an ignition system for igniting the fuel-air charge formed in said combustion chamber, an exhaust system for discharging the burnt combustion products from said combustion chamber, means for sensing at least one engine running condition, and means for controlling said fuel injection system to inject fuel into said combustion chamber in an amount determined by the sensed engine running condition, the injection of fuel during all of said engine running conditions being in two increments, both occurring before firing of the spark plug and separated by a period when no fuel is injected, the increment occurring closest to spark plug firing being of a constant amount regardless of the running condition.

2. An internal combustion engine as defined in claim 1, wherein the amount of fuel injected during at least one of the increments is varied in response to variations in the engine running condition.

3. An internal combustion engine as defined in claim 2, wherein at least one of the increments of fuel injection is terminated immediately before the firing of the spark plug.

4. An internal combustion engine as defined in claim 1, wherein the engine is a two-cycle crankcase compression engine and wherein the induction system delivers the air charge to a crankcase chamber for transfer to the combustion chamber through at least one scavenge passage and wherein both the scavenge passage and the exhaust system opening and closing is controlled by movement of a piston reciprocating in a cylinder bore.

5. A method of operating an internal combustion engine having a combustion chamber, the volume of which varies cyclically during engine operation, an induction system for delivering an air charge to said combustion chamber, a direct injection system for injecting fuel directly into said combustion chamber, an ignition system for igniting the fuel-air charge formed in said combustion chamber, an exhaust system for discharging the burnt combustion products from said combustion chamber, means for sensing at least one engine running condition, said method comprising the steps of controlling said fuel injection system to inject fuel into said combustion chamber in an amount determined by the sensed engine running condition, the injection of fuel during all of said engine running conditions being in two increments, both occurring before firing of the spark plug and separated by a period when no fuel is injected, the increment occurring closest to spark plug firing being of a constant amount regardless of the running condition.

6. A method of operating an internal combustion engine as defined in claim 5, wherein the amount of fuel injected during at least one of the increments is varied in response to variations in the engine running condition.

7. A method of operating an internal combustion chamber as defined in claim 6, wherein at least the increment of fuel injection closest to the time of spark plug firing is terminated immediately before the firing of the spark plug.

8. A method of operating an internal combustion engine as defined in claim 5, wherein the engine is a two-cycle crankcase compression engine and wherein the induction system delivers the air change to a crankcase chamber for transfer to the combustion chamber through at least one scavenge passage and wherein both the scavenge passage and the exhaust system opening and closing is controlled by movement of a piston reciprocating in a cylinder bore.

9. An internal combustion engine having a combustion chamber, the volume of which varies cyclically during engine operation, an induction system for delivering an air charge to said combustion chamber, a direct injection system for injecting fuel directly into said combustion chamber, an ignition system for igniting the fuel-air charge in said combustion chamber, an exhaust system for discharging the burnt combustion products from said combustion chamber, means for sensing at least one engine running condition, and means for controlling said fuel injection system to inject fuel into said combustion chamber in an amount determined by the sensed engine running condition, the injection of fuel during at least a range of said engine running condition being in at least two increments and one of which is in a fixed amount regardless of the engine running condition within said range, at least two of said increments occurring before firing of the spark plug and all of said increments being separated by a period when no fuel is injected, the fuel injection during another range of running conditions is injected in a single increment.

10. An internal combustion engine as set forth in claim 9, wherein the engine is a two-cycle crankcase compression engine and wherein the induction system delivers the air charge to a crankcase chamber for transfer to the combustion chamber through at least one scavenge passage and wherein both the scavenge passage and the exhaust system opening and closing is controlled by the movement of a piston reciprocating in a cylinder bore.

11. An internal combustion engine as defined in claim 9, wherein the amount of fuel injected during the single increment is varied in response to variations in the load.

12. An internal combustion engine as defined in claim 11, wherein the amount of fuel injected immediately before firing of the spark plug is held fixed throughout the entire range of engine running conditions.

13. An internal combustion engine as defined in claim 12, wherein the amount of fuel injected during the first increment during the range of running conditions forms a smooth transition with the amount of fuel injection when there is only one increment of fuel injection.

14. A method of operating an internal combustion engine having a combustion chamber, the volume of which varies cyclically during engine operation, an induction system for delivering an air charge to said combustion chamber, a direct injection system for injecting fuel directly into said combustion chamber, an ignition system for igniting the fuel-air charge formed in said combustion chamber, an exhaust system for discharging the burnt combustion products from said combustion chamber, means for sensing at least one engine running condition, said method comprising the steps of controlling said fuel injection system to inject fuel into said combustion chamber in an amount determined by the sensed engine running condition, the injection of fuel during at least a range of said engine running conditions being in at least two increments and one of which is in a fixed amount regardless of the engine running condition within said range, at least two of said increments occurring before firing of the spark plug and all of said increments being separated by a period when no fuel is injected, the fuel injection during another range of the load conditions is injected in a single increment.

15. A method of operating an internal combustion engine as set forth in claim 14 wherein the engine is a two-cycle crankcase compression engine and wherein the induction system delivers the air charge to a crankcase chamber for transfer to the combustion chamber through at least one scavenge passage and wherein both the scavenge passage an the exhaust system opening and closing is controlled by a movement of a piston reciprocating in a cylinder bore.

16. A method of operating an internal combustion engine as defined in claim 14, wherein the amount of fuel injected during the single increment is varied in response to variations in the load.

17. A method of operating an internal combustion engine as defined in claim 16, wherein at least one of the increments of fuel injection is terminated immediately before the firing of the spark plug.

18. A method of operating an internal combustion engine as defined in claim 17, wherein the amount of fuel injected immediately before firing of the spark plug is held fixed throughout the range of engine running conditions.

19. A method of operating an internal combustion engine as defined in claim 18, wherein the amount of fuel injected during the first increment during the range of running conditions forms a smooth transition with the amount of fuel injection when there is only one increment of fuel injection.

20. An internal combustion engine having a combustion chamber, the volume of which varies cyclically during engine operation, an induction system for delivering an air charge to said combustion chamber, a direct injection system for injecting fuel directly into said combustion chamber, an ignition system for igniting the fuel-air charge formed in said combustion chamber, an exhaust system for discharging the burnt combustion products from said combustion chamber, means for sensing at least one engine running condition, and means for controlling said fuel injection system to inject fuel into said combustion chamber in an amount determined by the sensed engine running condition, the injection of fuel during at least one range of said engine running conditions being in two increments, both occurring before firing of the spark plug and separated by a period when no fuel is injected, the amount of fuel injected immediately before firing of the spark plug being held fixed throughout the one range of engine running conditions and being terminated immediately before the firing of the spark plug, the amount of fuel injected during the other of said increments being varied in response to variations in the engine running condition.

21. An internal combustion engine as set forth in claim 20, wherein the engine is a two-cycle crankcase compression engine and wherein the induction system delivers the air change to a crankcase chamber for transfer to the combustion chamber through at least one scavenge passage and wherein both the scavenge passage and the exhaust system opening and closing is controlled by the movement of a piston reciprocating in a cylinder bore.

22. An internal combustion engine as defined in claim 20, wherein the engine running condition comprises engine load.

23. An internal combustion engine as defined in claim 22, wherein the amount of fuel injected under all running conditions is in two increments, with the amount of fuel injected in the increment immediately before spark plug firing being held constant under all engine running conditions.

24. An internal combustion engine as defined in claim 22, wherein the range of engine load wherein the fuel is injected in two increments comprises at least the high-mid range of load.

25. An internal combustion chamber as defined in claim 24, wherein the amount of fuel injected during the high-load condition is injected to terminate well before the firing of the spark plug, and the duration is varied in response to engine load.

26. An internal combustion engine as defined in claim 25, wherein under low-speed, low-load conditions the amount of fuel injected is varied in response to load and is terminated immediately prior to the firing of the spark plug.

27. A method of operating an internal combustion engine having a combustion chamber, the volume of which varies cyclically during engine operation, an induction system for delivering an air charge to said combustion chamber, a direct injection system for injecting fuel directly into said combustion chamber, an ignition system for igniting the fuel-air charge formed in said combustion chamber, an exhaust system for discharging the burnt combustion products from said combustion chamber, means for sensing at least one engine running condition, said method comprising the steps of controlling said fuel injection system to inject fuel into said combustion chamber in an amount determined by the sensed engine running condition, the injection of fuel during at least one range of said engine running conditions being in two increments, both occurring before firing of the spark plug and separated by a period when no fuel is injected, the amount of fuel injected immediately before firing of the spark plug being held fixed throughout the one range of engine running conditions and being terminated immediately before the firing of the spark plug, the amount of fuel injected during the other of said increments being varied in response to variations in the engine running condition.

28. A method of operating internal combustion engine as set forth in claim 27 wherein the engine is a two-cycle crankcase compression engine and wherein the induction system delivers the air charge to a crankcase chamber for transfer to the combustion chamber through at least one scavenge passage and wherein both the scavenge passage and the exhaust system opening and closing is controlled by a movement a piston reciprocating in a cylinder bore.

29. A method of operating an internal combustion engine as defined in claim 27, wherein the engine running condition comprises engine load.

30. A method of operating an internal combustion engine as defined in claim 29, wherein the amount of fuel injected under all running conditions is in two increments, with the amount of fuel in the increment immediately before spark plug firing being held constant under all engine running conditions.

31. A method of operating an internal combustion engine as defined in claim 29, wherein the range of engine load wherein the fuel is injected in two increments comprises at least the high-mid range of load.

32. A method of operating an internal combustion engine as defined in claim 31, wherein the amount of fuel injected during the high-load condition is injected to terminate well before the firing of the spark plug, and the duration is varied in response to engine load.

33. A method of operating an internal combustion engine as defined in claim 32, wherein under low-speed, low-load conditions the amount of fuel injected is varied in response to load and is terminated immediately prior to the firing of the spark plug.

* * * * *

UNITED STATES PATENT AND TRADEMARK OFFICE
CERTIFICATE OF CORRECTION

PATENT NO.    : 5,732,674
DATED         : March 31, 1998
INVENTOR(S)   : Motoyama et al.

Page 1 of 1

It is certified that error appears in the above-identified patent and that said Letters Patent is hereby corrected as shown below:

Column 8,
Line 20, please change "air change" to -- air charge --.
Line 30, please change "charge in said" to -- charge formed in said --.

Column 10,
Line 2, please change "change to" to -- charge to --.
Line 31, please change "an air in charge" to -- an air change --.
Line 65, please change "fuel in the" to -- fuel injected in the --.

Signed and Sealed this

Fifteenth Day of October, 2002

Attest:

JAMES E. ROGAN
Attesting Officer
Director of the United States Patent and Trademark Office